BY John D. Graham
ATTORNEY

John D. Dickun
ATTORNEY

BY

John D. [signature]
ATTORNEY

BY John D. Graham
ATTORNEY

BY

John D. [signature]
ATTORNEY

United States Patent Office 3,323,241

Patented June 6, 1967

3,323,241

PASSIVE INFORMATION DISPLAYS

John W. Blair, Dallas, and Hilton W. Spence, Richardson, Tex., assignors to Texas Instruments Incorporated, Dallas, Tex., a corporation of Delaware Filed Oct. 24, 1965, Ser. No. 504,569
7 Claims. (Cl. 40—28)

This invention relates to information displays, and more particularly to passive information displays which utilize materials that change color with changes in temperature.

Within the past several years, research and development has been carried out in search for effective means of information display. This search has been particularly extensive in the field of aircraft and space vehicle applications where a desire for fast response time, high resolution, and brightness in a high light-level environment imposes stringent requirements upon any display design.

Information displays may be roughly broken down into two categories:

(1) active or light generating displays, and
(2) passive or light reflecting displays.

A distinct disadvantage of the former type of display (active) is when the display is used in a high light-level environment such as that ordinarily encountered in airplane and space vehicle cockpits, there being a lack of sharp contrast between the display and the surrounding environment.

On the other hand, a passive display operating on the principle of light reflection offers the advantage of being viewed easily in very high light-level conditions, even with direct sunlight impinging upon the viewing area. An illustration of this principle is the written page which produces no light of its own. The page when viewed in total darkness is invisible to the eye. However, as the light intensity on the page is increased, the white areas of the page increasingly reflect the incident light while the dark written areas absorb it, so that intelligence is imparted to the reader. Thus the page may be read in very light-level conditions. In total darkness, of course, the passive display may be seen by providing a small source of illumination somewhere in the vicinity of the display panel or screen.

It is, therefore, an object of this invention to provide a new and improved form of information display which utilizes the reflection of light (passive display) and consequently may be easily seen in a high light-level environment. It is another object of the invention to provide a new and improved form of information display which requires a minimum of mechanical motion, which reduces the problems associated with the change of information representation from one form to another, and which provides high resolution and a fast response time.

In accordance with these and other objects, the present invention comprises a layer of material, known as thermochromic material, disposed over an array of heating elements, the thermochromic material changing color with changes in temperature. The array of heating elements (ordinarily resistors) are so arranged that select ones of the array define a form of information representation, and when these select ones are heated (for example by passing a current through the resistors) above that transition temperature at which the thermochromic material changes color, the portions of the thermochromic layer which overlie the select heating elements change color.

For example, assume that a layer of thermochromic material that changes color from red to black at 70° C. is formed over an array of resistors. If the letter A is to be displayed, the array of resistors are selectively heated to a temperature of 70° C. or above in a pattern correponding to the letter A. The overlying thermochromic layer will then selectively change from red to black in the corresponding pattern and thus display the letter A, the unchanged red material providing the background for the black A. The material would then revert to its original color upon cooling, and another letter may subsequently be displayed in the same manner. Since the contrast between the black letters and the red background is enhanced by an increase in light reflecting off the display panel, the display is easily seen in a high light-level environment.

As will subsequently be described, various types of heater arrays may be utilized in combination with the thermochromic material. For example, resistors formed of a conductive material, as tantalum, may be selectively evaporated upon a ceramic substrate. Using solid state technology, resistors may be diffused into one face of a flat planar semiconductor wafer, or may be formed within semiconductor mesas disposed upon a ceramic substrate. Metallized leads arranged in the desired pattern selectively interconnect the resistors to each other and to external wires for energizing the resistors in the particular pattern desired. Since the device is primarily an electronic one, there is a minimum (or absence) of mechanical motion, a reduction in the problems associated with the change of inormation representation from one form to another (the information up to the end appearing as an electrical signal), and an increase in display speeds over those obtainable with mechanical type displays. In addition, because the heater elements may be formed extremely close to one another, the display devices of this invention have very high resoluton.

The novel features believed characteristic of this invention are set forth in the appended claims. The invention itself, however, as well as other objects, feature and advantages thereof, may best be understood by reference to the following detailed description when read in conjunction with the accompanying drawings, in which:

Before describing the fabrication of the present invention it would be useful to define a number of terms that will be utilized in the specification and the appended claims. The term "array" has reference to the overall pattern of the plurality of individual heating elements. The term "character" is used to describe individual groupings of heating elements, the characters being spaced from one another, the characters and their spacing making up the "array."

Figure 1:
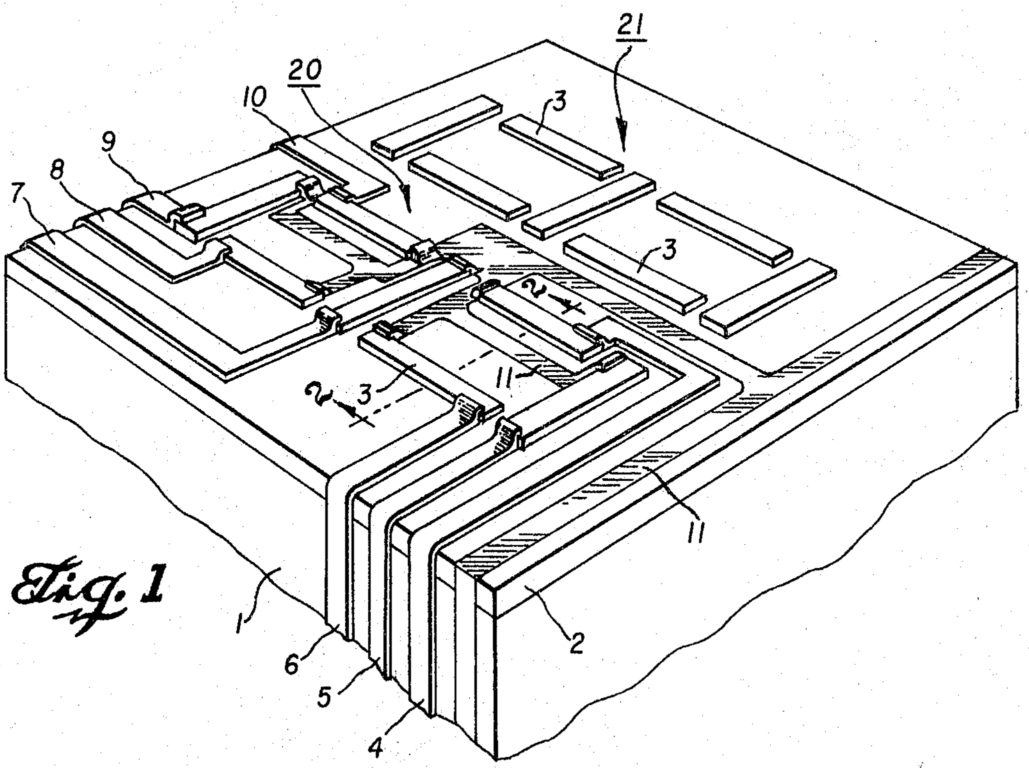
FIGURE 1 is a pictorial view of one embodiment of the present invention before the application of the thermochromic layer.

With reference to FIGURE 1, there is now described the initial steps in the fabrication of one embodiment of a display device in accordance with the present invention. A plurality of thin film resistors 3 are selectively located in a desired array upon a substrate 2 of high resistivity material, alumina for example. The array shown in FIGURE 1 forms the characters 20 and 21, each character comprising 7 resistors.

The resistors 3 are formed of any suitable material, for example tantalum or tin oxide, and may be deposited by conventional techniques, as for example, sputtering or evaporating the tantalum through a mask. As an alternative method, a tantalum layer may be formed completely covering the substrate 2, and selectively removed by conventional photographic masking and etching techniques to provide the desired pattern or array. The seven resistor bars of each character may be apprxoimately 5 mils by 70 mils, and approximately 0.5 mil thick.

Evaporated metal leads, as 4–10, formed of gold for example, respectively make connection to one end of each of the resistors 3 of character 20. The other end of the resistors may be tied together by the interconnection 11 and the lead 12. A similar interconnection pattern may be formed for the character 21. The structure is mounted upon a heat sink 1 which may be a copper block, for example, with the leads appropriately insulated from one another.

Figure 2:
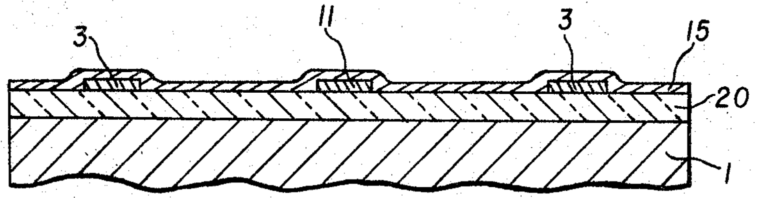
FIGURE 2 is a sectional view of a portion of the structure shown in FIGURE 1, taken along the section line 2—2 after the application of the thermochromic layer.

A layer 15 of thermochromic material is deposited over the substrate 2, resistor array, and interconnections, as shown in FIGURE 2, to a thickness of approximately 0.5 to 5 mils. The thermochromic material may be deposited directly by sublimation, for example, or the material may be pulverized and mixed with a binder such as the organic glues or silicone greases or resins, and spread over the face of the array.

Many different thermochromic materials are available, each material having various characteristics, their use for the layer 15 depending upon the particular design considerations. Among these various characteristics are: phenomenon causing color change, thermal properties, thermal response, physical and chemical stability.

The change of color with change in temperature associated with thermochromic materials may be attributed to two distinct phenomena. One phenomenon may be referred to as color "shift," and is due to the increased absorption of high energy photons (short wave length light) as the material is heated. The observed color is due to the light not absorbed, and the color proceeds or "shifts" gradually through some portion of the chromatic scale as follows:

[heating———→

| | | | | | | | | |
|---|---|---|---|---|---|---|---|---|
| white | violet | blue | green | yellow | orange | red | brown | black |

cooling·]←———

For example, mercuric iodide ($HgI_2$) is orange at low temperatures and becomes increasingly dark red in color as the temperature approaches 127° C.

Many materials, however, undergo a rapid color change over a small temperature interval, a change that occurs from one region of the chromatic scale to another, and not necessarily in the same direction. This color change is not due to a color "shift," but rather to changes in energy absorption caused by alterations of the crystallographic structure of the thermochromic material itself, brought about by the temperature variations. Thermochromic materials which exhibit this phenomenon (often called phase change) have a special appeal for use in the display device of this invention, since their color change is sharp and dramatic rather than gradual.

Of the thermochromic materials that exhibit this phase change, the materials that are suitable have been found to be the iodides and bromides of the form MX, $MX_2$, $M_2$, $X_2$, and the coordination compounds of the form $M_2M_1X_4$, where the M's are 1B elements from the periodic table (copper sub-group), or the outer transition elements from the sixth period. The X's are the halide elements. Some of these materials are listed along with their color changes and approximate color change transition temperature:

| Thermochromic Material | Transition Temperature, ° C. | Color Change |
|---|---|---|
| CuI | 61 | White to orange. |
| AgI | 145 | Yellow to brown. |
| HgI | 75 | Yellow to orange. |
| TlI | 190 | Do. |
| HgBr | 70 | White to yellow. |
| TlBr | 168 | White to pale yellow. |
| $HgI_2$ | 127 | Red to yellow. |
| $PbI_2$ | 210 | Orange to red. |
| $HgBr_2$ | 105 | White to yellow. |
| $Cu_2HgI_4$ | 70 | Red to black. |
| $Ag_2HgI_4$ | 51 | Yellow to brown. |
| $Pb_1HgI_4$ | 134 | Orange-red to yellow. |
| $Hg_2HgI_4$ | 160 | Yellow-orange to red. |
| $Tl_2HgI_4$ | 170 | Yellow to yellow-orange. |
| $Cu_2PbI_4$ | 172 | Yellow to tan. |
| $Ag_2PbI_4$ | 122 | Yellow to brick red. |
| $Tl_2PbI_4$ | 210 | Yellow to dark brown. |
| $Hg_2PbI_4$ | 200 | Do. |

These changes have been found to be reversible upon cooling. Other inorganic compounds, such as oxides, sulfides, chromates, borates, and coordination complex compounds, as well as numerous organic compounds are thermochromic, changing color at the transition temperature, and reverting back to the original color upon cooling:

| Thermochromic Material | Approximate Transition Temperature, ° C. | Color Change |
|---|---|---|
| $Cu(BO_2)_2$ | 140 | Blue to yellow-green. |
| $PbCrO_4$ | 160 | Yellow to dark brown. |
| HgO | 100 | Red to brown. |
| Di(N,N-diethylene diamine), copper (II) perchlorate. | 42 | Ruby red to deep blue. |

Figure 3:
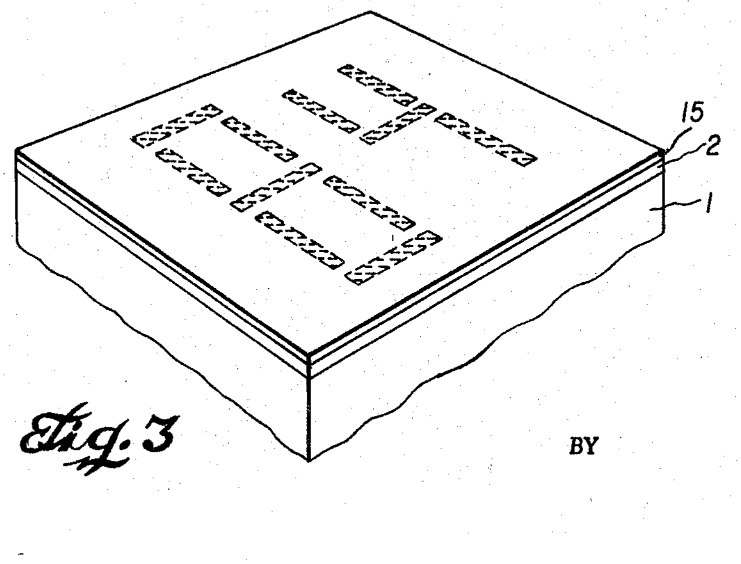
FIGURE 3 is a pictorial view of the device of FIGURE 2 showing the operation of the device, displaying the numerals "8" and "4"

The actual operation of the display device may be accomplished by various techniques and is not restricted to any one method. For example, the lead 12 shown in FIGURE 1 may be grounded (or placed at negative potential), and a positive voltage applied to selected leads, such as 4–10 the difference in voltage causing current to flow through the select resistors 3, these selected resistors thus heating up. The increase in heat in the resistors causes the portions of the thermochromic layer 15 that overlie the selected resistors to correspondingly heat up, and when the temperature of these portions reach the transition temperature of the material, they change color, thus displaying the information desired. As shown in FIGURE 3, selected resistors of the characters 20 and 21 were energized to display the numerals "8" and "4," respectively. In like manner, other resistors may be selectively energized to heat the corresponding overlying portions of the thermochromic material to other numbers, letters, figures, etc. The selection of the proper leads (and therefore the resistors) to be energized may be accomplished manually or by a more complex electronic drive logic scheme.

The thermochormic material chosen for the layer 15 should have physical stability (for example, able to withstand high temperature operations without vaporzing); chemical stability (will not decompose or react unfavorably in the surrounding environment or with the adjacent materials as leads, substrate, etc.); and should be easily and conveniently applied to the underlying substrate over the heater array (preferably by sublimation). The layer 15 should have low specific heat and be as thin as possible in order to reduce thermal inertia, thus enabling the display to be turned "off" and "on" quickly as well as to quickly dissipate the heat from the layer 15 after display in order to avoid heat "spillover" through the thermochromic material to other portions of the layer 15 that are not to change color. The thermochromic material chosen should also be of sufficient electrical resistivity to avoid any current shunt paths through the layer 15.

As mentioned above, it is ordinarily desired that the display turn on and off sharply, thus requiring that the thermochromic material change color quickly when the transition temperature is reached (exhibit little or no super heating) and revert sharply to its original color when the power is turned off and the material cools below its transition temperature (exhibit little or no undercooling). In some instances, however, it may be desirable to display a piece of information as a letter, number, etc. for a relatively long period of time. This may be accomplished, of course, by continuously pulsing the particular leads, thus keeping the select portions of the thermochromic material above the transition temperature. Alternatively, however, it may be desirable to employ a thermochromic material which may be undercooled below the transition temperature without immediately reverting back to its original color, thus providing a more persistent display. One material which exhibits this hysteresis effect is $HgI_2$ which changes sharply from red to yellow when heated to the transition temperature of 127° C., but does not regain its original color of red until the temperature is lowered to approximately 90° C.

While no one thermochromic material will necessarily meet, nor need meet, every single one of the above requirements, these factors should be considered, and the selection of the appropriate material be chosen with regard to the particular application.

When the thermochromic layer 15 of FIGURES 2 and 3 is deposited by mixing the thermochromic material with a binder and spread over the heater array, the binder essentially serves two purposes: (1) it holds the thermochromic material in physical contact with the substrate 2 and the heater array, and (2) it holds the thermochromic material in thermal contact with the array of heating elements. As previously mentioned, various types of binders may be utilized. At operating temperatures from −100° C. to 250° C., organic polymers may be used, while above 250° C. it may be desirable to use silicone resins. In addition to having many of the same desirable properties discussed with respect to the thermochromic material, the binder material should be substantially transparent so as to not interfere with the display properties of the thermochromic layer 15.

The material of which the substrate 2 is fabricated should exhibit both sufficient electrical resistivity to insure electrical isolation between the leads and resistors, and sufficient thermal isolation to avoid heat spillover. In addition, the substrate 2 should have sufficient thermal conductivity to allow quick cooling of the resistors and the thermochromic material after each display. One material which offers a suitable compromise between these desired objectives is alumina. The block 1 should be of a material that allows its use as a heat sink, for example copper, but should be fabricated in a manner that allows the leads 4–10, for example, to be electrically isolated from one another. This may be accomplished by conventional techniques, as providing slots in the side of the block for the leads, the slots being coated with an insulating material.

Various other types of heater arrays may be utilized in combination with the thermochromic material. For example, instead of forming thin film resistors upon an insulating substrate, as described with reference to FIGURES 1–3, it may be desirable to use solid state technology and form the array of resistors by diffusion into one face of a flat semiconductor wafer, as silicon, the thermochromic layer overlying the diffused array. Because of the thermal properties of the silicon wafer, fast response times for the display may be achieved.

In accordance with another embodiment of the present invention, however, there is now described with reference to FIGURES 4–12, the fabrication of a display device using a heater array of the type described and claimed in copending U.S. patent application, Ser. No. 492,174, filed Oct. 1, 1965, and assigned to the assignee of the present invention.

Figure 4:
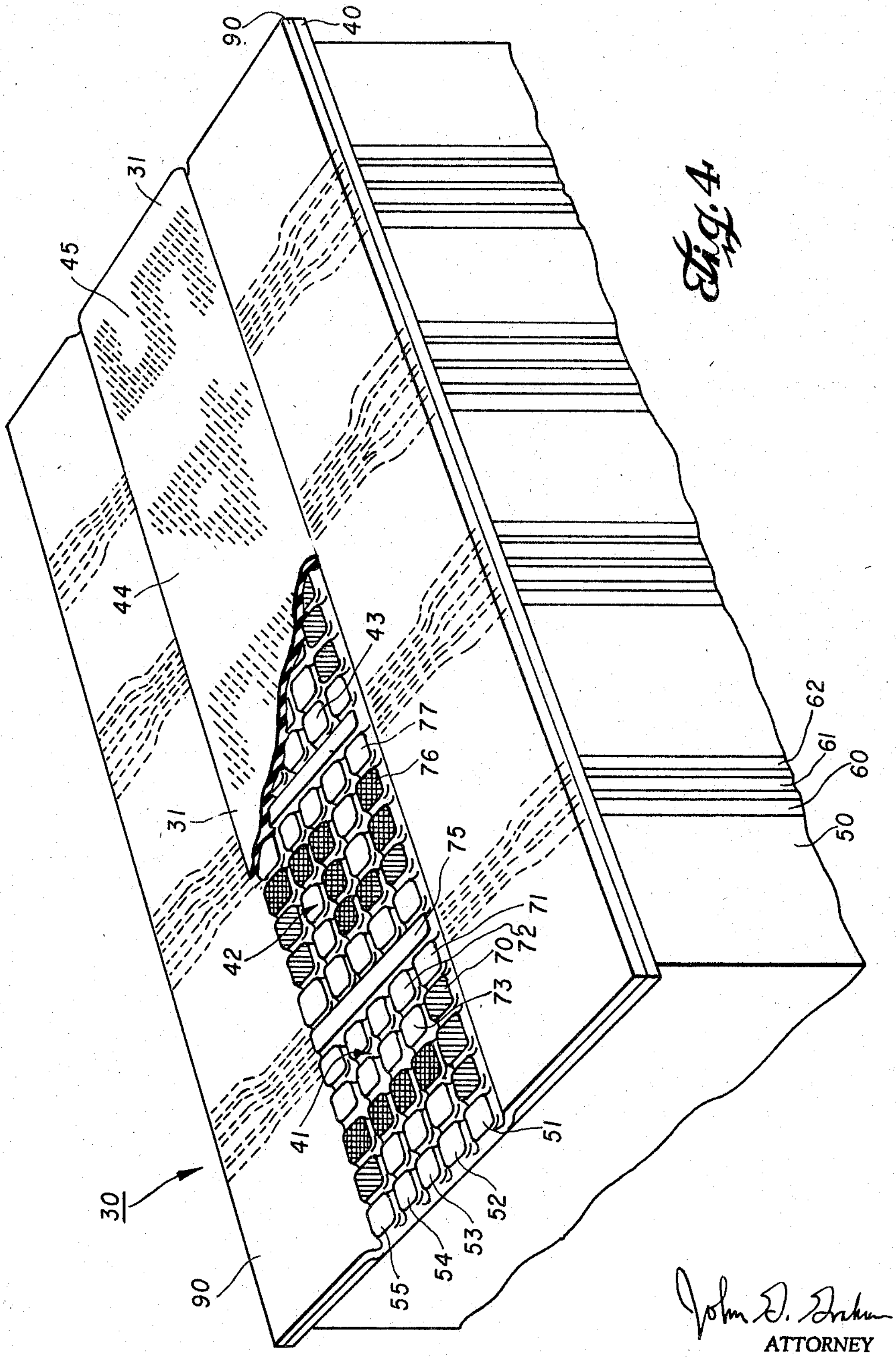
FIGURE 4 is a top view of another embodiment of the present invention showing an array of mesa heating elements with a layer of thermochromic material overlying the array, the heating elements disposed in the form of a plurality of characters with selected elements in each character energized to display the numbers "1," "2," "3," "4," and "5"

Referring now to FIGURE 4, there is depicted a top view of the passive display device 30, comprising a wafer 40 of semiconductor material, silicon for example, having five "characters" 41–45 formed therein with a layer 31 of thermochromic material overlying the "characters." A portion of the layer 31 is shown removed in FIGURE 4 so as to observe the underlying characters 41, 42, and a portion of 43. Each of the characters is composed of a matrix of thermal heating elements such as the elements 51–55 of the characters 41. Each element is a raised mesa of semiconductor material with a layer of silicon carbide 90 over the top of the mesas and the rest of the slice 40, each mesa containing an interconnected diode and resistor. The particular array or the dimensions of the characters are not critical to the invention. In the particular embodiment herein shown and described, however, each character is composed of a 5 x 5 array of heating elements, each of the heating elements, 51–55 for example, being approximately 0.016 inch in length and 0.012 inch in width, the spacing between each element being approximately 0.004 inch. The silicon wafer 10 may be approximately 0.3 inch in width by 0.5 inch in length and have a thickness of approximately 0.001 to 0.002 inch. The active display surface (in other words, the thermochromic layer overlying the "characters" and their spacing) occupies an area of approximately 0.1 inch by 0.5 inch, and is centrally located upon the wafer 40.

The silicon wafer 40 with the mesas therein is mounted upon a ceramic substrate 50 so that the metallized leads 60–62, for example, formed upon the sides of the substrate 50 interconnect with the expanded leads 60*a*–62*a*, respectively, located on the underside of the excess material of the wafer 40. These expanded leads, as well as the other expanded leads, are actually extensions of the second level interconnections which make contact to the various first level interconnections of the heating elements shown in FIGURE 5. The metallized leads 60–62 may be formed directly upon the surface of the ceramic substrate 50, or may be formed within slots within the sides of the ceramic. The joining of the expanded leads 60*a*–62*a* to the external metallized leads 60–62 may be accomplished by any conventional technique, as for example, by flow solder fillets. An epoxy may then be placed under the overhanging portions of the silicon slice to provide added mechanical support.

The actual operation of the display may be accomplished by various techniques and is not restricted to any one method of excitation of the appropriate heating elements. For example, a short high power pulse may be applied to selected external leads, such as 60–62, the pulse causing current to flow through resistors of select heating elements, the selected printing elements heating up to the transition temperature of the thermochromic material in a pattern corresponding to the letters or numbers to be displayed. The selection of the proper leads to be energized may be accomplished mechanically or by a separate diode digital decoder, for example. Accordingly, as shown in FIGURE 4, select elements of the "characters" 41–45 may be heated to define the numbers "1," "2," "3," "4," and "5," respectively, which then heat the overlying portions of the layer 31 to cause these portions to change color and display the numbers "1," "2," "3," "4," and "5." (The select heating elements which have been heated are represented on FIGURE 4 by a double cross-hatching, the display numerals by dashed lines, and may be best seen by holding the drawing at arm's length from the eye.) Depending upon the interconnection scheme used, the display may be accomplished, for example, by simultaneously heating select elements of "characters" 41–45, thereby displaying a whole line at a time, or by heating the select elements of the characters in a manner so as to sequentially display the numbers "1" through "5."

Figure 5:
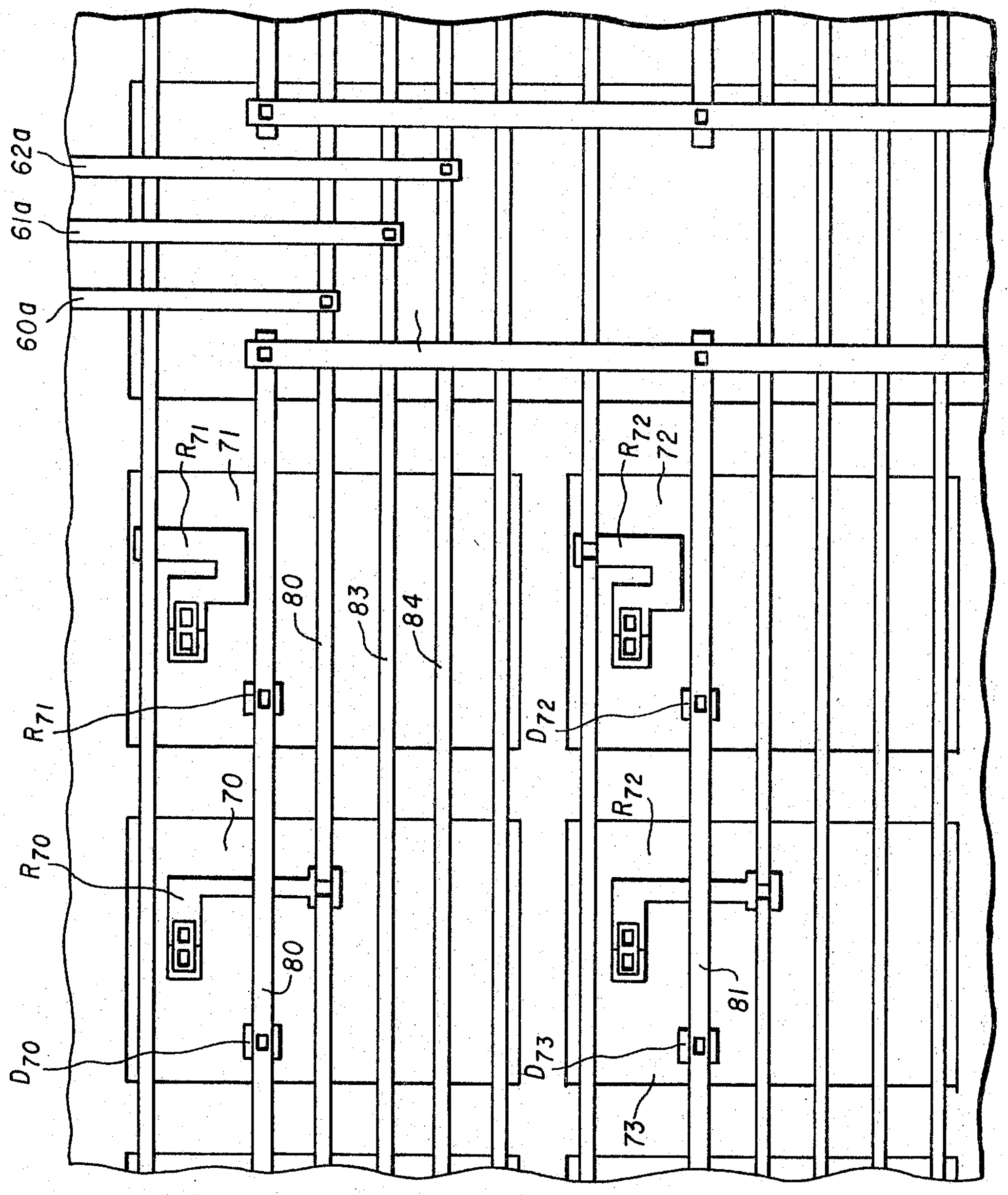
FIGURE 5 is an underside view of a portion of the array shown in FIGURE 4, illustrating the formation of diode-resistor pair within each mesa element, and the lead and expanded interconnection pattern between elements.

Referring now to FIGURE 5, there is depicted an underside plan view of a portion of one of the "characters" 41, showing some of its heating elements 70, 71, 72, and 73 and a typical, but not restrictive, pattern of interconnections. Each of the heating elements comprises a raised mesa of semiconductor material (as observed in the cross-sectioned views of FIGURES 6–10), a diode and resistor pair such as $D_{70}$ and $R_{70}$ being formed by conventional masking and diffusion techniques, for example, in the base of the mesa, the pair being interconnected with each other and with the rest of the system. The function of the resistors $R_{70}$, $R_{71}$, $R_{72}$, and $R_{73}$ is to provide the source of heat for each mesa heating element, and the function of the diodes $D_{70}$, $D_{71}$, $D_{72}$, and $D_{73}$ is to direct the current flow through only those resistors which are to be heated. First level interconnectors such as 80 and 81 ohmically connect the P-type regions of the diodes $D_{70}$ and $D_{71}$ and the P-type regions of diodes $D_{72}$ and $D_{73}$ to the second level interconnector 105, respectively, and first level interconnectors 82, 83, and 84 connect the ends of the resistor $R_{70}$ and other resistors of the other mesas (not shown in FIGURE 5) to the second level interconnectors *60a*, *61a*, and *62a*, respectively.

Figure 12:
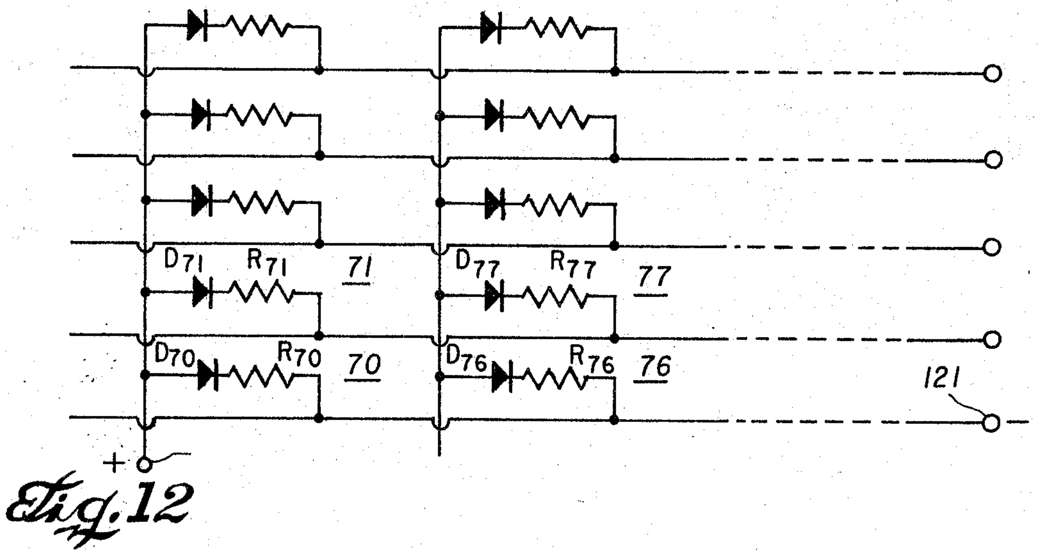
FIGURE 12 is a schematic circuit diagram illustrating, by way of example, the operation of the display device of FIGURE 4.

The function of the diodes may be further understood by reference to the schematic representation shown in FIGURE 12. The diode-resistor pairs within the elements 70, 71, 76, and 77 are interconnected as shown. Assume that the element 70 is to be heated (i.e., a current made to flow through the resistor $R_{70}$ of element 70), but the elements 71, 77, and 76 are to remain "cool," i.e., no current is to flow through the resistors $R_{71}$, $R_{77}$, and $R_{76}$. A source of positive potential is applied to the terminal 120 while a source of negative or ground potential is applied to terminal 121. Due to the blocking effect of the diode $D_{77}$, the only current path between the positive and negative terminals is the one through the diode $D_{70}$ and resistor $R_{70}$. Consequently, only the element 70 heats up. Similarly, utilizing the same principle and arrangement, the remaining diodes and resistors of the other elements may be wired in like manner or in any other conventional manner, to selectively heat desired elements, the diodes functioning as current blocks. It is to be pointed out that the use of the diodes allows one to limit the number of external leads; if a pair of leads is applied to each element of each character, there is no need for the diodes.

Figure 6:
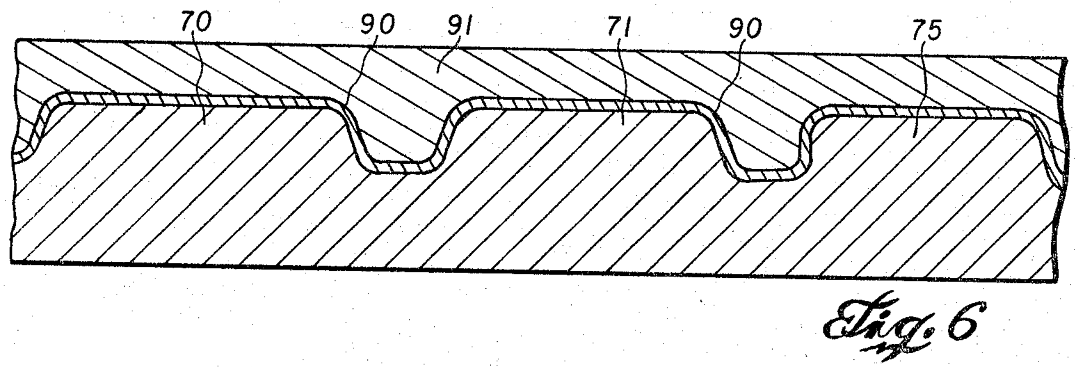
FIGURES 6–10 are sectional views of a portion of the heating elements shown in FIGURE 5, taken along the section line 6—6, and showing subsequent steps in the fabrication of the display device of FIGURE 4.

With reference to the cross-section views of FIGURES 6–10 there is now described the fabrication of the display device of FIGURE 4, particularly the formation of the silicon mesa heating elements and the overlying layer of thermochromic material. Single crystal semiconductor material, such as silicon, is used as the starting material for a slice 40. A portion of this slice is shown in FIGURE 6. The top surface of the slice is first masked and etched to form a pattern of raised mesas such as 70, 71, and 75. The masking may be by a material such as wax or preferably by photoresist techniques which permit excellent geometry control. The height of the mesas 70, 71 and 75, for example, or in other words, the depth of the etching may be approximately 1.5 to 2 mils. After the mesas are formed, the top surface of the slice is covered with a coating 90 of silicon carbide which may be formed by any technique to a thickness of perhaps 0.3 to 0.8 mil.

Figure 11:
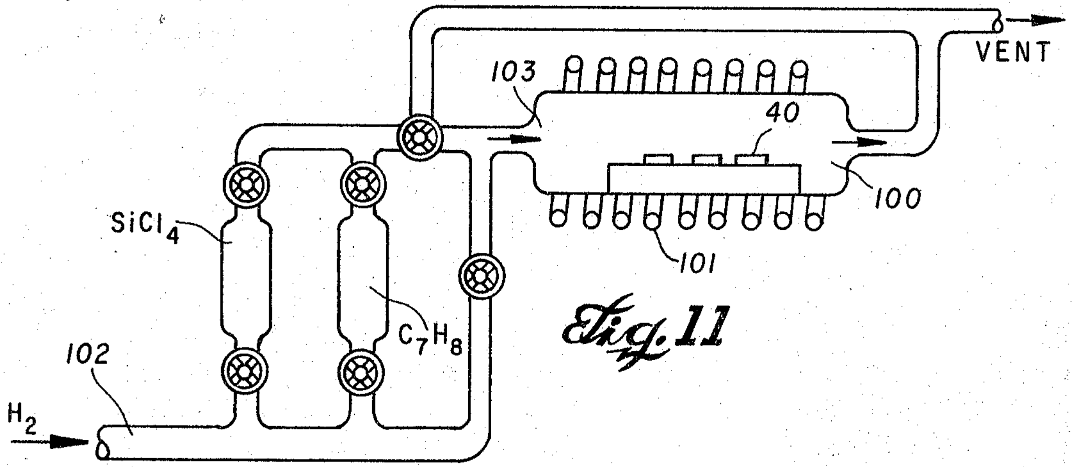
FIGURE 11 is a front elevation, partially in section, showing one form of apparatus utilized in the fabrication of the display device of FIGURE 4.

One method of depositing the silicon carbide is described with reference to FIGURE 11. Apparatus for depositing the silicon carbide in accordance with this process comprises a reactor in the form of a furnace tube 100 having heating coils 101. The furnace may be of a horizontal or vertical type, may be suited for single or multiple slices, and may be either resistively or inductively heated. Silicon slices, including the slice 40, with the mesas formed therein, are disposed within the furnace in such a position as to expose the slices to gases directed into the tube through a conduit 103. Toluene ($C_7H_8$) and silicon tetrachloride ($SiCl_4$) vapors are respectively introduced into the conduit 103 from cylinders containing liquid toluene and liquid silicon tetrachloride, through which hydrogen gas is bubbled. Purified dried hydrogen enters end 102 of the conduit. The flow of the gases into the tube furnace 100 is regulated by conventional valves.

The rate of deposition is determined largely by the temperature at which the reactor is maintained, the flow rate through the conduit 103, and the percentage composition of the constitutents. For example, when the flow rate was kept at approximately 10 liters per minute, the temperature at approximately 1080° C., and the reactive mixture consisted of 0.87 mol percent of $SiCl_4$; 0.18 mol percent $C_7H_8$, and the remaining mol percent $H_2$, a layer of silicon carbide was deposited upon slice 40 as seen in FIGURE 6 at a rate of approximately 1 micron per minute.

A layer 91 of material, for example polycrystalline semiconductor material, is now deposited over the top surface of the slice 40 adjacent the silicon carbide layer 60, as seen in FIGURE 6. The most common method of deposition is by the hydrogen reduction of silicon tetrachloride, a technique well known in the art and requiring no elaboration here. The conductivity type of the layer 91 is not crtical; the crystalline structure may also be either single crystalline or amorphous, and should be, perhaps, six or eight mils or more to facilitate handling.

Figure 7:
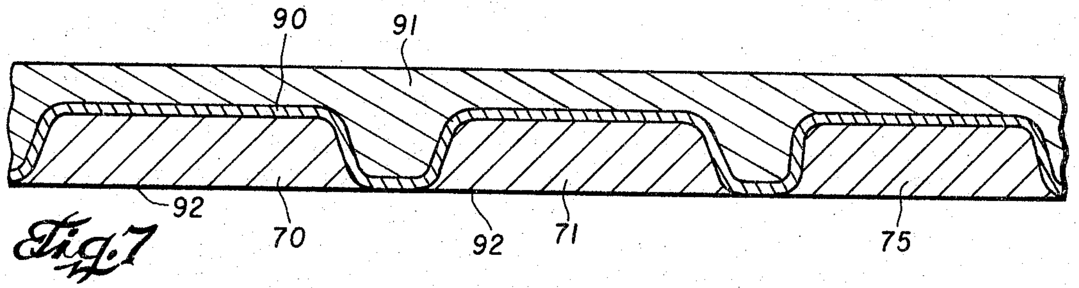

As the next step in the fabrication, the structure of FIGURE 6 is subjected to a lapping and polishing treatment on its lower face to remove all the original silcon material except that portion remaining within the mesas 70, 71, and 75, as illustrated in FIGURE 7. The silicon carbide coating 90 functions as a substantially continuous "stop" to the lapping and polishing operation, enabling precision control to be maintained over the amount of semiconductor material left within the mesa regions. This is important for a variety of reasons. First, as a consequence of the various steps preceding the lapping operation, the silicon slice will bow, presenting a somewhat conpex or concave surface to the lapping apparatus. Hence, when the lapping and polishing operations are carried out to remove the substrate material from below the mesa regions, a considerable number of the mesas will be cut through and destroyed. The silicon carbide layer 90 tends to halt the lapping operation at the lower face 92 so that none of the mesas will be cut through. Second, because of the precision control that can be maintained, the actual thickness of the semiconductor material within the mesa regions may be controlled to a precise degree. This is important since the thickness of each of the mesas influences their rate of heating and cooling (in other words, the thermal response) which, in turn, determines the "off" and "on" speed of the display.

Figure 8:
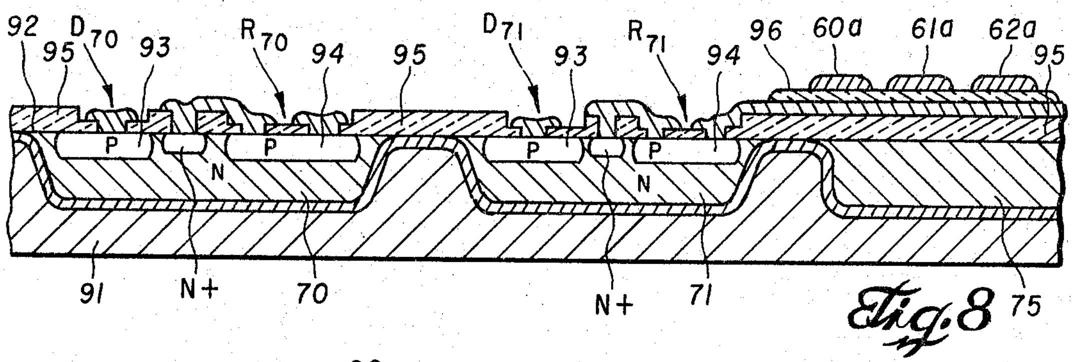

Inverting the structure and looking at what was the bottom surface of face 92 of FIGURE 7, but what will now be considered the top face of the unit, the structure appears as in FIGURE 8. The mesa regions 70 and 71 now serve as regions into which subsequent diffusions, or upon which epitaxial depositions, may be made in order to fabricate the diode-resistor pair of each heating element. In this particular embodiment the diode-resistor pair $D_{70}$ and $R_{70}$ and $D_{71}$ and $R_{71}$ are formed by conventional oxide masking and diffusion operations in the N-type material of mesa elements 70 and 71, respectively.

P-type diffused regions 93*a* and 93*b* provide the respective anodes of the diodes $D_{70}$ and $D_{71}$, while elongated P-type regions 94*a* and 94*b* formed simultaneously with the anode regions, provide the resistors $R_{70}$ and $R_{71}$. The N-type material of the mesas 70 and 71 provide the cathodes of the diodes $D_{70}$ and $D_{71}$. Contact to the N-region is made through low resistivity N+ regions as shown. The diffusion operations utilize silicon oxide masking as mentioned so that an oxide layer 95 is formed which acquires a stepped configuration in the final device. Openings are made in the oxide where contact is necessary, then metal film is deposited over the oxide and selectively removed to provide the desired contacts and interconnections.

It is to be observed that the silicon mesa 75 is masked with the silcon oxide layer 95 during the formation of the diodes and resistors in the various mesa heating elements. This region provides the spacing between the individual characters as also observed in FIGURES 4 and 5. The second level interconnections 60*a*, 61*a*, and 62*a*, for example, are formed over these regions between the characters rather than over the mesa heating elements in order to prevent exposure of the insulation between these leads to the high temperature thermal transients associated with the operation of display. An insulating layer 96 capable of withstanding high temperatures is formed by conventional techniques intermediate the first level interconnections and the second level interconnections 60*a* and 61*a* as shown in FIGURE 8.

Figure 9:
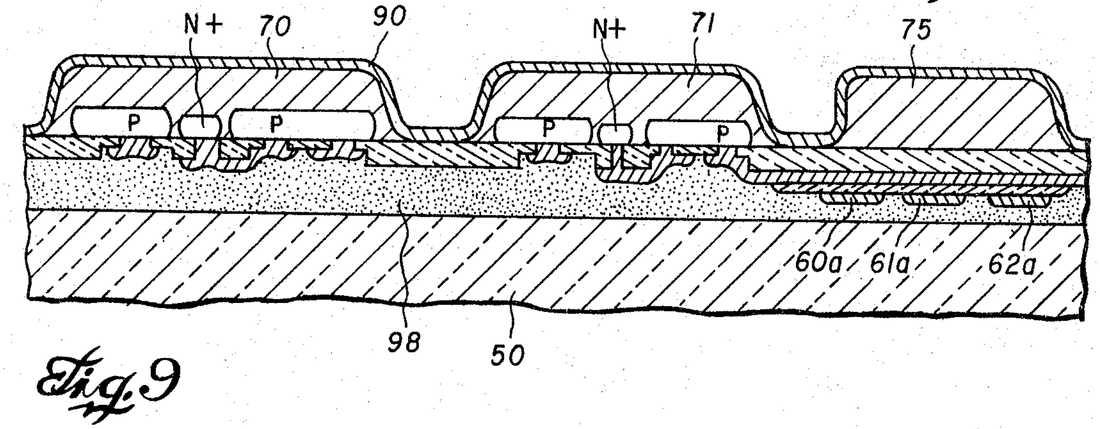

As the final steps in the fabrication, the composite structure with the individual mesa heating elements is sawed into the individual wafers and inverted and mounted upon ceramic substrate 50 with a suitable adhesive 98, such as epoxy, as shown in FIGURE 9. The wafer with the mesa heating elements is aligned so that the second level interconnections 60*a*, 61*a*, and 62*a*, for example, engage the appropriate metallized lead pattern on the ceramic substrate, as shown in FIGURE 4, the joining of the metal being accomplished by soldering. As the next step in the process, the polycrystalline semiconductor layer 91 is completely removed, resulting in a structure shown in FIGURE 9, whereby each of the mesa heating element 70 and 71, for example, are isolated from each other by the layer 90 of silicon carbide and the surrounding ambient (air, for example). This removal is accomplished by applying an etchant such as a mixture of hydrofluoric acid (2 parts volume), nitric acid (15 parts per volume) and acetic acid (5 parts per volume) to the top surface, whereby all of the polycrystalline material 91 is etched away, while the semiconductor material within the individual mesas is protected from the etchant by the layer 90 of silicon carbide acting as an etch barrier.

Figure 10:
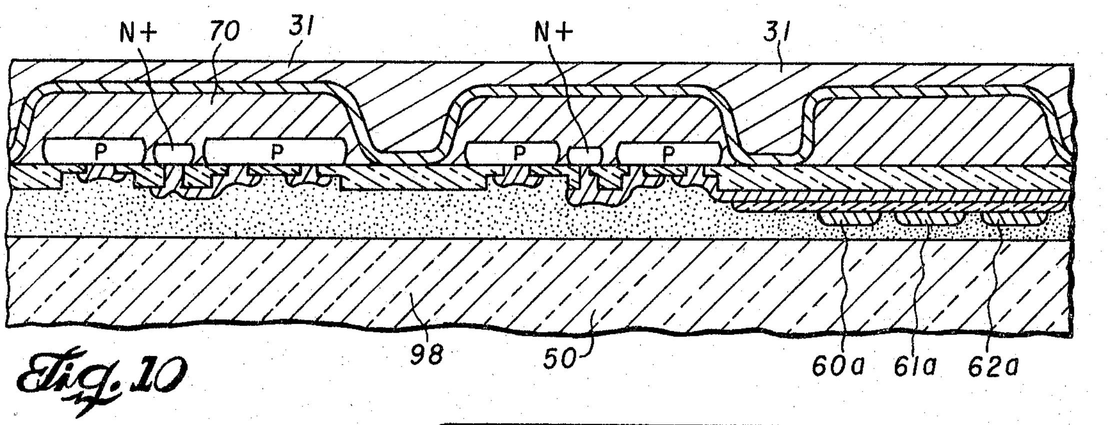

The thermochromic layer 31 is then applied over the array of heating elements, as shown in FIGURE 10, to the desired thickness. When a voltage is applied to the appropriate leads, as previously described, the current will pass through the selected resistors causing them to heat up, the increase in heat causing the mesa elements to heat, which in turn heat the select portions of the thermochoromic layer to the transition temperature, resulting in the display. This flip chip mesa embodiment offers a number of advantages. First, because of the mesa heating, elements may be formed extremely close together, very high resolution may be achieved. Second, the diode-resistor pairs as well as the metallic leads and interconnections are positioned away from the thermochromic layer 31. This is desirable where the layer 31 is fabricated of material that would chemically react with the resistors and for the leads, etc., when in physical contact with them.

The operating characteristics of the display systems of this invention depend, therefore, upon the type of heater array employed, the choice of materials, and the various dimensions of the component parts of the systems. For one particular structure where the heater array employed was of the type shown in FIGURE 1 (evaporated resistors upon a ceramic substrate), and the device operated at a constant D.C. supply of 25 volts, the display required 300 mw. per heating element or 2.1 w. per character. Pulsing the voltage however causes a considerable decrease in average power required, much below that value required to operate most active type displays.

Various modifications of the disclosed embodiments may be made without departing from the scope of the invention. For example, since the ambient temperature may fluctuate during operation of the device, control of this temperature of control of the input power as a function of this ambient temperature may be accomplished by conventional means as thermostatically controlled housings, temperature compensated substrates, etc.

In addition, although the above description has been referenced either to a numeric or alpha-numeric display, the present invention is equally applicable for displaying figures, ciphers, symbols, as well as other types of information. The array of heating elements may be arranged in any number of "characters" or alternatively in one large character covering the whole display screen. Other design modifications may be made by one skilled in the art without departing from the spirit and scope of the appended claims.

What is claimed is:

1. A passive display device, comprising:
(a) a substrate,
(b) an array of heating elements upon one surface of said substrate, said array being so arranged that select ones of said elements define a form of information representation,
(c) a layer of thermochromic material overlying said array, and
(d) means for energizing said select ones of said heating elements, thereby to cause portions of said thermochromic layer overlying said select ones to change color and display said form of information representation.

2. The device as described in claim 1 wherein said form of information representation is a letter of an alphabet.

3. The device as described in claim 1 wherein said form of information representation is a number.

4. A passive display device, comprising:
(a) a substrate,
(b) an array of resistors upon one surface of said substrate, said array being so arranged that select ones of said resistors of said array define a form of information representation,
(c) a layer of thermochromic material overlying said array, and
(d) means for supplying current in said select ones of said resistors, thereby to heat said select ones and cause portions of said thermochromic layer overlying said select ones to change color and display said form of information representation.

5. A passive display device, comprising:
(a) a semiconductor body,
(b) an array of diffused resistors within one surface of said body, said array being so arranged that select ones of said diffused resistors of said array define a form of information representation,
(c) a layer of thermochromic material overlying said array, and (d) means for supplying current in said select ones of said resistors, thereby to heat said select ones and cause portions of said thermochromic layer overlying said select ones to change color and display said form of information representation.

6. A display device, comprising:
(a) a substrate,
(b) an array of semiconductor mesas upon one surface of said substrate, said array being so arranged that select ones of said mesas of said array define a form of information representation,
(c) a resistor within each of said select ones of said mesas,
(d) a layer of thermochromic material overlying said array, and
(e) means for supplying current in each of said resistors, thereby to heat said select ones of said mesas and portions of said thermochromic layer overlying said select ones, and display said form of information representation.

7. A passive display device, comprising:
(a) a substrate member of high resistivity material having at least one plane surface,
(b) an array of semiconductor mesas upon said at least one plane surface, said array being so arranged to form a plurality of characters spaced from one another, selected mesas of said character defining a form of information representation,
(c) an interconnected diode and resistor within each of said selected mesas, said diode and resistor being vertically spaced from the top surface of each of said selected mesas and being near said plane surface,
(d) a layer of thermochromic material overlying said array of semiconductor mesas, and
(e) means for selectively supplying current in each of said interconnected diode and resistor, thereby to cause portions of said thermochromic layer overlying said selected mesas to change color and display said form of information representation.

References Cited

UNITED STATES PATENTS

| | | | |
|---|---|---|---|
| 3,225,470 | 12/1965 | Schwab et al. | 40—130 X |
| 3,256,518 | 6/1966 | Crane | 350—160 |

EUGENE R. CAPOZIO, *Primary Examiner.*

W. J. CONTRERAS, *Assistant Examiner.*